United States Patent
Reinhardt

(10) Patent No.: US 10,344,552 B2
(45) Date of Patent: Jul. 9, 2019

(54) ROTATING CONTROL DEVICE HAVING A PARTITION SEAL ASSEMBLY

(71) Applicant: Weatherford Technology Holdings, LLC, Houston, TX (US)

(72) Inventor: Paul Andrew Reinhardt, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 358 days.

(21) Appl. No.: 14/969,153

(22) Filed: Dec. 15, 2015

(65) Prior Publication Data
US 2017/0167221 A1  Jun. 15, 2017

(51) Int. Cl.
| | |
|---|---|
| *E21B 33/08* | (2006.01) |
| *E21B 3/00* | (2006.01) |
| *F16C 33/78* | (2006.01) |
| *F16J 15/44* | (2006.01) |
| *F16C 33/76* | (2006.01) |
| *F16C 19/06* | (2006.01) |
| *F16C 19/28* | (2006.01) |
| *F16C 19/54* | (2006.01) |

(52) U.S. Cl.
CPC .............. *E21B 33/085* (2013.01); *E21B 3/00* (2013.01); *F16C 33/7893* (2013.01); *F16J 15/441* (2013.01); *F16C 19/06* (2013.01); *F16C 19/28* (2013.01); *F16C 19/54* (2013.01); *F16C 33/76* (2013.01); *F16C 2352/00* (2013.01)

(58) Field of Classification Search
CPC .................................. E21B 33/00; E21B 33/03
See application file for complete search history.

(56) References Cited

U.S. PATENT DOCUMENTS

| | | |
|---|---|---|
| 3,365,251 A | 1/1968 | Venable |
| 4,285,406 A | 8/1981 | Garrett et al. |
| 4,783,084 A | 11/1988 | Biffle |
| 4,895,215 A | 1/1990 | Rives |
| 5,498,085 A | 3/1996 | Kizer et al. |
| 5,711,615 A * | 1/1998 | Stitz ...................... F16C 27/045 384/471 |

(Continued)

OTHER PUBLICATIONS

PCT International Search Report and Written Opinion dated Feb. 2, 2017, for International Patent Application No. PCT/US2016/055313.

(Continued)

*Primary Examiner* — David J Bagnell
*Assistant Examiner* — Manuel C Portocarrero
(74) *Attorney, Agent, or Firm* — Patterson + Sheridan, LLP

(57) ABSTRACT

A rotating control device (RCD) which partitions the rotating speed of an inner barrel relative to a rotary and stationary seal via a roller bearing assembly. The roller bearing assembly causes the rotary seal to rotate at near half the speed, or portion of the speed thereof, of the inner barrel. Alternatively, a rotary seal assembly is rotatable by frictional contact with the inner barrel, and a stationary seal assembly is in frictional contact with the rotary seal assembly to prevent the rotary seal assembly from rotating at the same speed as the inner barrel. The speed differential between the inner barrel and the rotary seal, as well as between the rotary seal and the stationary seal is reduced by nearly half, which reduces wear and increases performance life of each seal.

25 Claims, 7 Drawing Sheets

(56) References Cited

U.S. PATENT DOCUMENTS

| | | |
|---|---|---|
| 7,464,750 B2 | 12/2008 | Schapel et al. |
| 2008/0106045 A1 | 5/2008 | Lembcke |
| 2009/0236144 A1* | 9/2009 | Todd .................. E21B 17/01 |
| | | 175/5 |

OTHER PUBLICATIONS

PCT International Preliminary Report on Patentability dated Jun. 28, 2018, for International Application No. PCT/US2016/055313.
EPO Office Action dated Apr. 15, 2019, for European Patent Application No. 16787957.6.

* cited by examiner

ROTATING CONTROL DEVICE HAVING A PARTITION SEAL ASSEMBLY

BACKGROUND

Field of the Disclosure

Embodiments of the present disclosure generally relate to a rotating control device (RCD) of use in a drilling operation. More specifically, embodiments of the present disclosure relate to an RCD having a partition seal assembly that increases seal performance and life.

Description of the Related Art

Drilling a wellbore for hydrocarbons requires significant expenditures of manpower and equipment. Thus, constant advances are being sought to reduce any downtime of equipment and expedite any repairs that become necessary. Rotating equipment requires maintenance as the drilling environment produces forces, elevated temperatures, and abrasive cuttings detrimental to the longevity of seals, bearings, and packing elements.

Rotating control device (RCD) technology has become an important tool for lowering drilling costs and increasing well productivity, especially in many hard-rock areas and mature oil and gas fields. Lower drilling costs are achieved primarily by faster penetration rates, reduced non-drilling time, and reduced mud volume requirements associated with under-balanced drilling.

RCDs are used as diverters on a wellhead or riser and are to be used with annular and ram blow out preventers, and thus have the ability to seal off pressure from a wellbore with or without tubulars in the wellbore. RCDs provide a rotating seal that allows drilling to proceed with the wellbore under pressure. RCDs create a pressure-tight barrier within the wellhead or riser that enables the containment and diversion of returning fluids, thus forming a line of defense against drilling hazards, such as kicks and shallow gas. RCD's permit closed-loop drilling, which offers environmental, cost, and safety benefits. In the past, wellhead pressure was typically limited to a few hundred PSI. Today, however rotary drilling operations are continued with as much as 2,500 PSI peak wellhead pressure while gas-cut fluid is circulated to the surface.

Rotary seals typically rely on a hydrodynamic film or a self-lubricating material. However, it is well known that the life span of rotary seals within RCD systems is relatively short mainly due to higher pressure and velocity (PV) conditions, and continual operations which cause the rotary seals within the RCD to break down rapidly. The greater the differential pressure and the higher the speed required both cause more stress on the rotary seal. Furthermore, reduced film thicknesses and increased friction lead to rotary seal failure. As such, the life of the rotary seals is relatively short and unpredictable. Furthermore, there is a trend in RCD equipment for higher pressure and higher speeds.

During the drilling operation, drill pipe or tubulars are axially and slidably moved through the RCD of a wellhead or riser. The axial movement of the drill pipe along with other forces experienced in the drilling operation cause wear and tear on the bearing and rotary seal assemblies of the RCD, and the rotary seal assemblies subsequently require repair. Typically, the drill pipe or a portion thereof is pulled from the RCD, and the bearing and rotary seal assembly in the RCD is then released. Thereafter, an air tugger or other lifting means in combination with a tool joint on the drill string can be used to lift the bearing and rotary seal assembly from the RCD. The bearing and rotary seal assembly are replaced or reworked, installed into the RCD, and the drilling operation is then resumed.

Therefore, what is needed in the art is a new and improved apparatus for improving rotary seal life. More specifically, what is needed in the art is an improved RCD apparatus for increasing rotary seal performance.

SUMMARY

In one embodiment, a rotating control device comprises an inner barrel; an outer barrel; a roller bearing assembly disposed between the inner barrel and the outer barrel, wherein the roller bearing assembly is rotatable by rotation of the inner barrel; a rotary seal assembly coupled to the roller bearing assembly; and a stationary seal assembly disposed adjacent to the rotary seal assembly.

In one embodiment, a rotating control device comprises an inner barrel; an outer barrel; a roller bearing assembly comprising an inner ring, an outer ring, a cage, and a cage insert disposed between the inner and outer rings, and wherein the roller bearing assembly is coupled to the inner barrel; a first seal coupled to a first seal carrier, wherein the first seal carrier is coupled to the cage insert of the roller bearing assembly; and a second seal coupled to a second seal carrier.

In one embodiment, a rotating control device comprises an inner barrel; an outer barrel; a rotary seal assembly disposed between the inner barrel and the outer barrel, wherein the rotary seal assembly is rotatable by frictional contact with the inner barrel; and a stationary seal assembly disposed between the inner barrel and the outer barrel, wherein the stationary seal assembly is in frictional contact with the rotary seal assembly to prevent the rotary seal assembly from rotating at the same speed as the inner barrel.

BRIEF DESCRIPTION OF THE DRAWINGS

So that the manner in which the above recited features can be understood in detail, a more particular description of the embodiments briefly summarized above may be had by reference to the embodiments below, some of which are illustrated in the appended drawings. It is to be noted, however, that the appended drawings illustrate only typical embodiments and are therefore not to be considered limiting of its scope, for the embodiments may admit to other equally effective embodiments.

DETAILED DESCRIPTION

Figure 1:
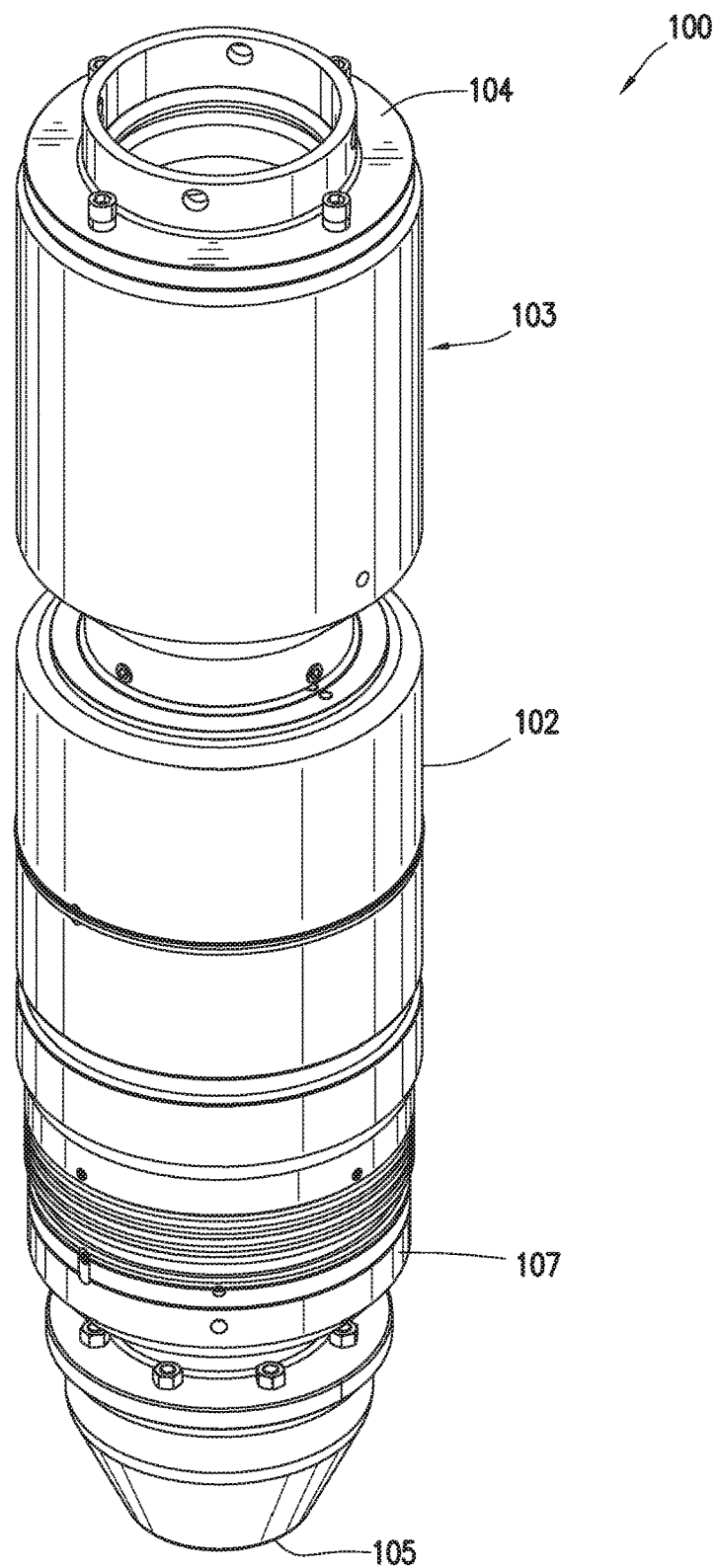
FIG. 1 illustrates a perspective view of a rotating control device, according to one embodiment disclosed herein.

FIG. 1 illustrates a rotating control device (RCD) 100 for use in a riser string during a drilling operation. The RCD 100 may be a rotary fluid sealing structure and is usable with a land or sea based drilling platform comprising one or more of a wellhead, a riser, motors, pumps, a rotating drill string, a hoisting structure, and a means for circulating drilling fluid. The RCD 100 creates a pressure tight barrier within a wellhead or riser that enables safe fluid containment and diversion against drilling hazards.

The RCD 100 includes an outer barrel 102 disposed between a first end 104 and second end 105. The RCD 100 further includes a top sub 103 disposed adjacent the first end 104 of the RCD 100, and a bottom sub 107 disposed adjacent the second end 105 of the RCD 100. The top sub 103 and the bottom sub 107 may guide, position, and/or centralize a drill string when being raised and lowered through a wellhead or riser. The top sub 103 and the bottom sub 107 may include seals configured to direct fluid around the RCD 100 and/or prevent fluid from entering the RCD 100.

Figure 2:
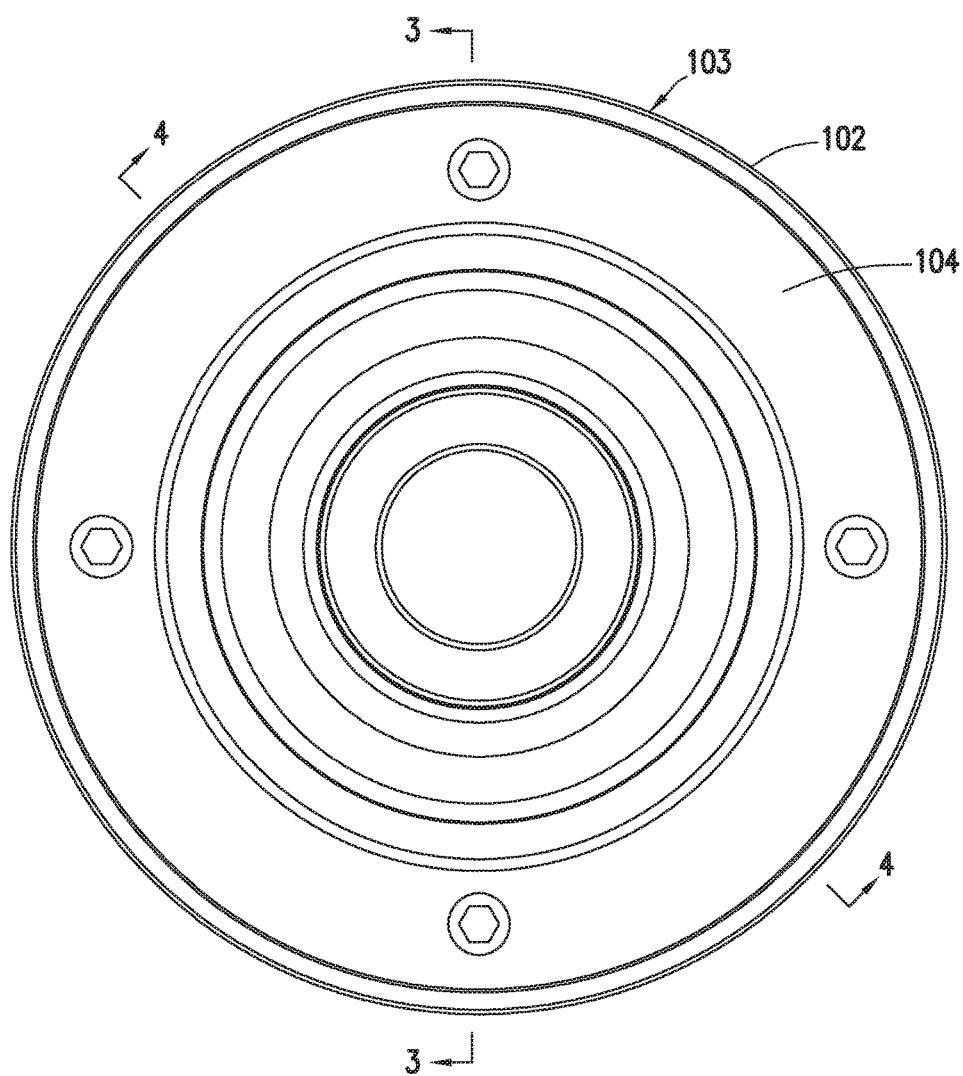
FIG. 2 illustrates a top view of the rotating control device of FIG. 1, according to one embodiment disclosed herein.

FIG. 2 illustrates a top view of the first end 104 of the RCD 100 of FIG. 1. In some embodiments, the first end 104 of the RCD 100 may be a top end. Drill pipe, or other tubulars, may be inserted into the RCD 100 via the first end 104 such that the drill pipe is lowered from the first end 104 via the top sub 103 to the second end 105. The RCD 100 permits the drill pipe to move axially and slidably through the RCD 100 while rotating. During a drilling operation, the RCD 100 may seal against the drill pipe being lowered through the RCD 100 to prevent drilling fluid and hydrocarbons from flowing up through a wellhead or riser and out onto the rig floor in an uncontrolled manner.

Figure 3:
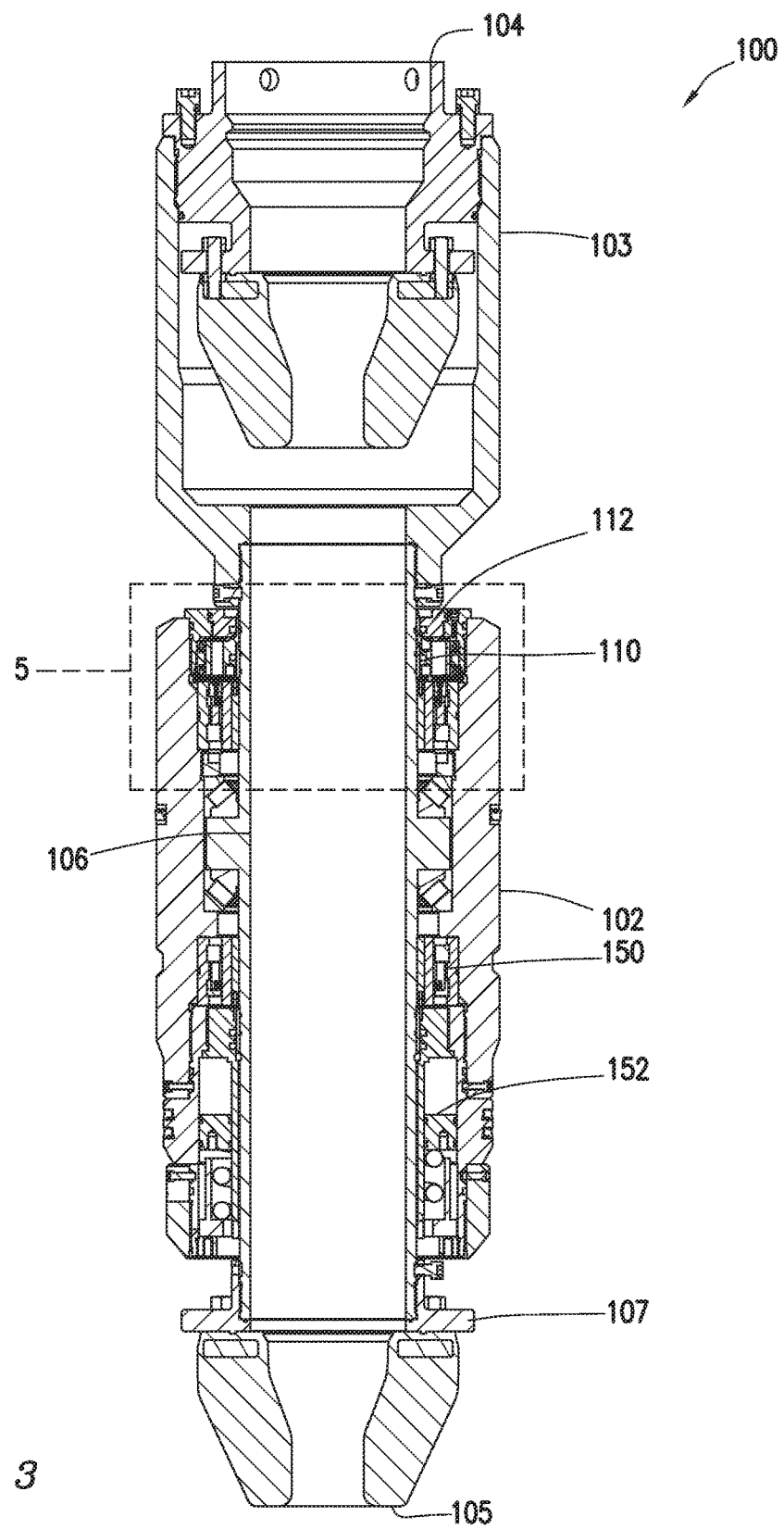
FIG. 3 illustrates a cross-sectional view taken along line 3-3 shown in FIG. 2, according to one embodiment disclosed herein.
Figure 4:
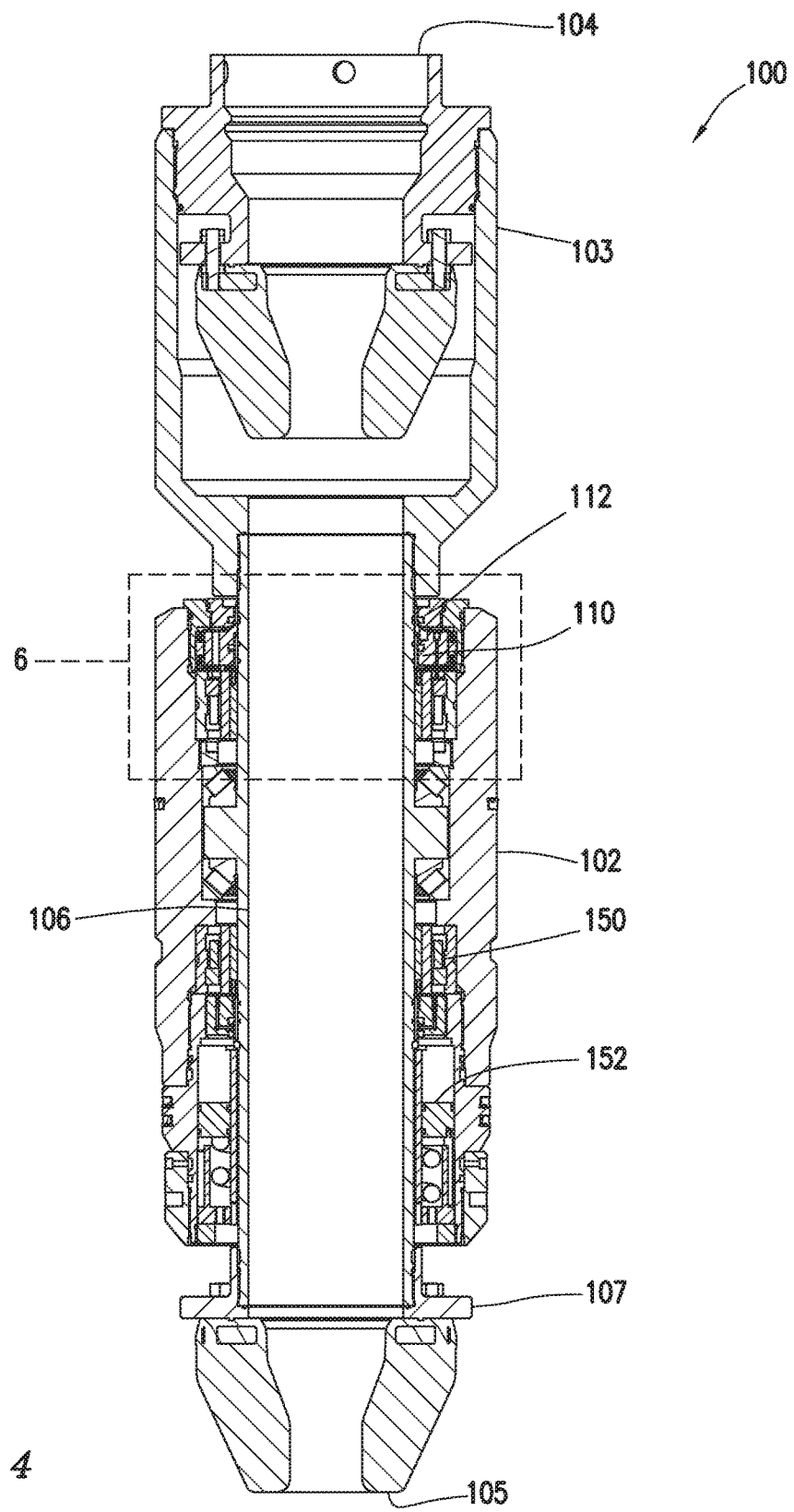
FIG. 4 illustrates a cross-sectional view taken along line 4-4 shown in FIG. 2, according to one embodiment disclosed herein.

FIGS. 3 and 4 each illustrate a different cross-sectional view of the RCD 100 of FIG. 1. As shown, the RCD 100 includes an inner barrel 106 that is rotatable by the top sub 103 relative to an outer barrel 102. The outer barrel 102 may be fixed in place when the RCD 100 is installed in a wellhead or riser. During operation, a drill string is inserted into the first end 104, moved through the top sub 103, inner barrel 106, and bottom sub 107, and out of the second end 105, while continuously rotating with the top sub 103 and the inner barrel 106 relative to the outer barrel 102. To maintain a seal between the inner barrel 106 and the outer barrel 102, the RCD 100 includes at least a first seal 110 and a second seal 112 as further shown and described with respect to FIGS. 5 and 6.

The first seal 110 and/or the second seal 112 form a seal between the rotating inner barrel 106 and the stationary outer barrel 102. The first seal 110 and/or the second seal 112 may comprise an elastomeric compound. As such, the first seal 110 and/or the second seal 112 may comprise a rubber material, a phenolic material, or any other material suitable for sealing during drilling operations. In some embodiments, the first seal 110 and/or the second seal 112 may be a mechanical seal and/or may comprise a metal material, a steel material, a carbide material, and/or combinations and mixtures thereof.

The RCD 100 further includes a roller assembly 150 disposed between the outer barrel 102 and the inner barrel 106. The roller assembly 150 may rotate and/or guide the movement of the inner barrel 106 relative to the fixed outer barrel 102 such that the drill string is moved through the top sub 103, the inner barrel 106, and the bottom sub 107. The RCD 100 may also include a compensation system 152, such as a pressure compensation system configured to maintain a positive pressure on the RCD 100 seals.

Figure 5:
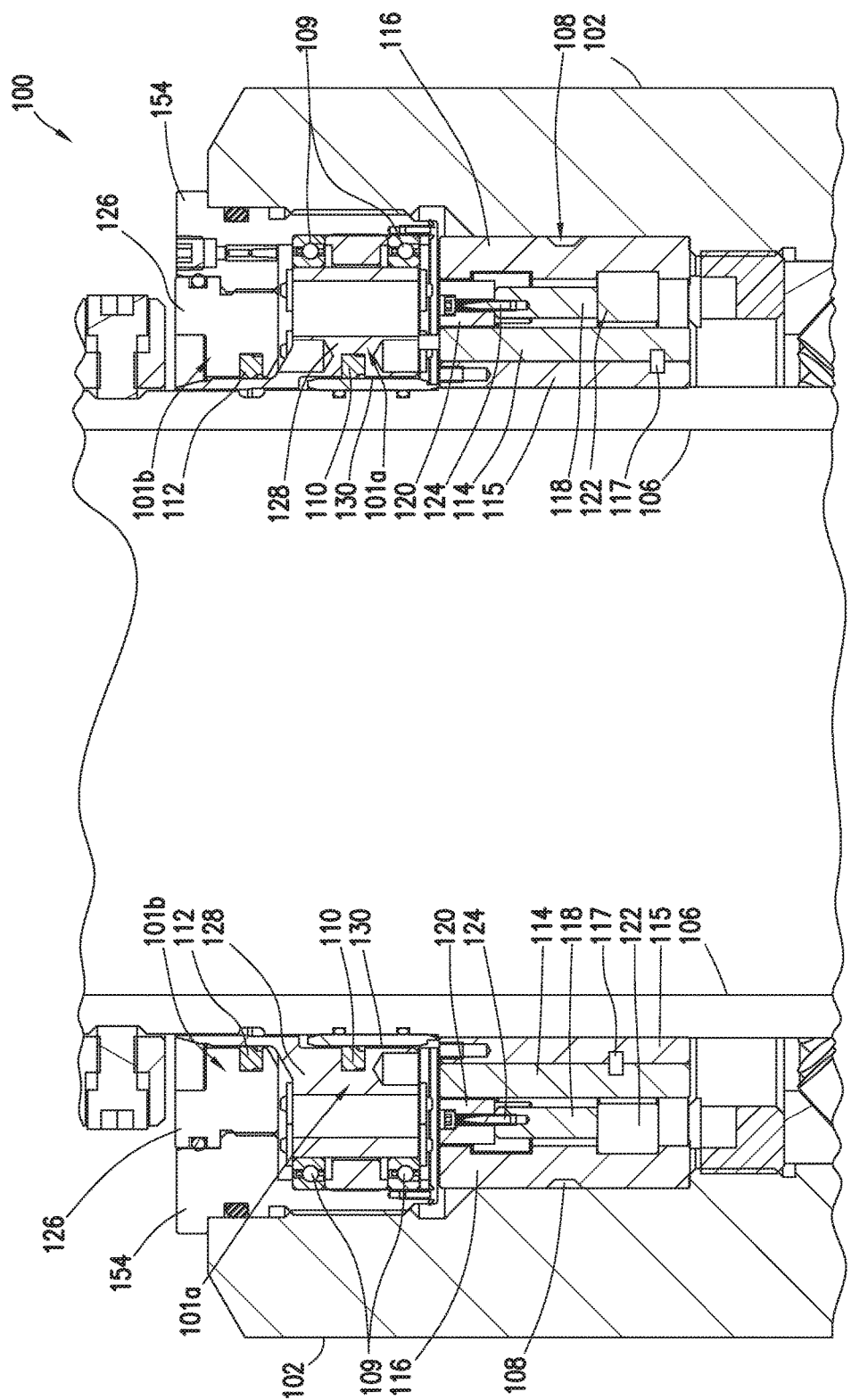
FIG. 5 illustrates an enlarged view of the region 5 of FIG. 3, according to one embodiment disclosed herein.
Figure 6:
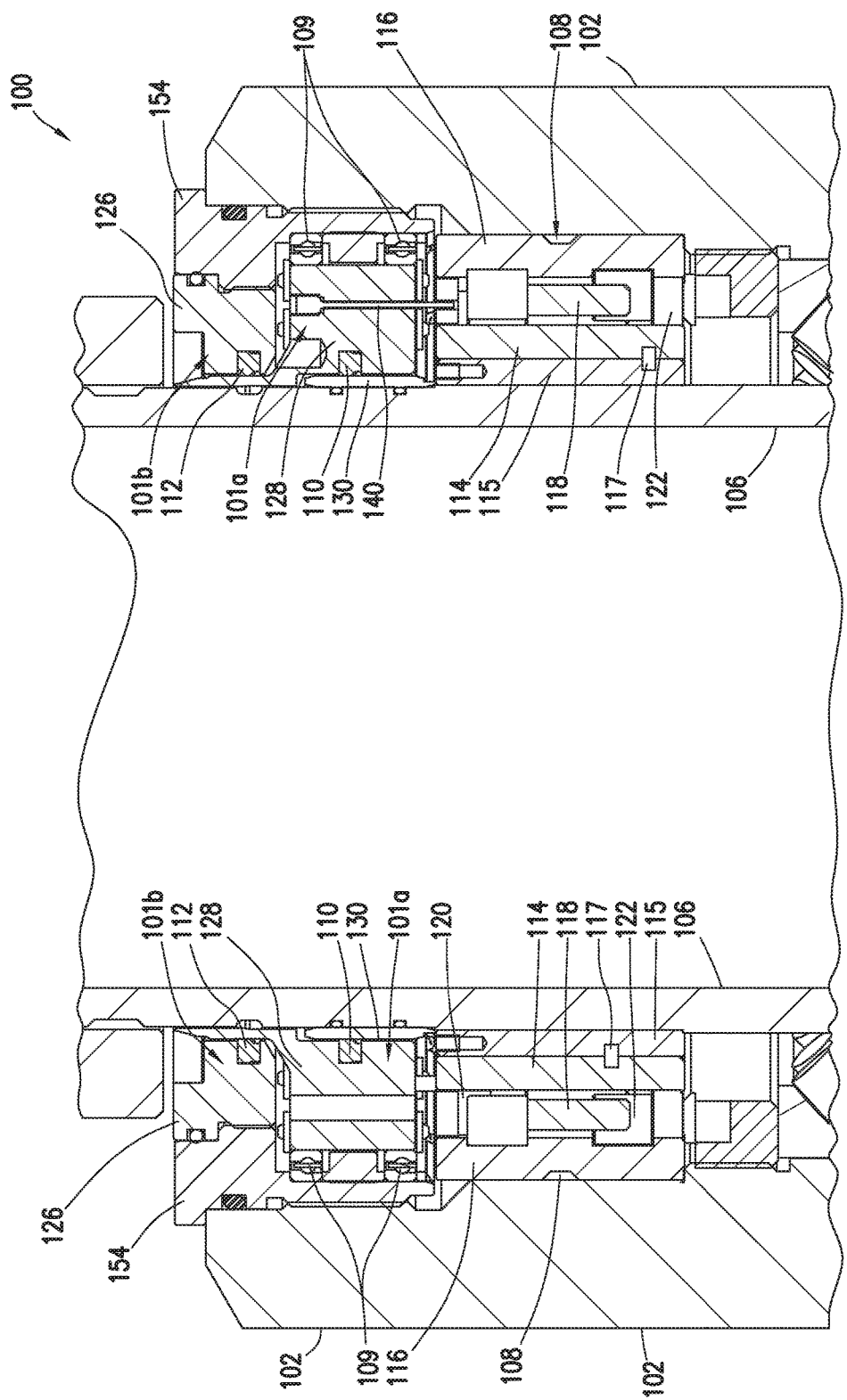
FIG. 6 illustrates an enlarged view of the region 6 of FIG. 4, according to one embodiment disclosed herein.

FIG. 5 illustrates an enlarged view of region 5 of FIG. 3, and FIG. 6 illustrates an enlarged view of region 6 of FIG. 4. In addition to the first seal 110 and the second seal 112, the RCD 100 includes a bearing assembly 108. In some embodiments, the bearing assembly 108 is a roller bearing assembly.

The bearing assembly 108 is disposed between the outer barrel 102 and the inner barrel 106. The bearing assembly 108 may comprise a metal material (for example, steel), a ceramic material, or any other material suitable for drilling operations. The bearing assembly 108 is coupled to the inner barrel 106. The inner barrel 106 is rotatable at a first rotational speed, such as by rotation of a drill string disposed through the RCD 100. As such, the bearing assembly 108 is rotatable by the inner barrel 106. The bearing assembly 108 is rotatable by the inner barrel 106 upon rotation of the inner barrel 106.

The inner barrel 106 may be coupled to a first sleeve member 115. The first sleeve member 115 may be disposed adjacent the inner barrel 106 and between the inner barrel 106 and the outer barrel 102. The first sleeve member 115 may have a length parallel to the length of the inner barrel 106. Furthermore, the first sleeve member 115 may be coupled to an inner ring 114 of the bearing assembly 108. In some embodiments, the first sleeve member 115 may be coupled to the inner ring 114 via a link member 117. In an alternate embodiment, the link member 117 may be omitted and the first sleeve member 115 and the inner ring 114 may be shrunk fit around the inner barrel 106.

The bearing assembly 108 includes an inner ring 114, an outer ring 116, a cage 118, and a cage insert 120. The cage 118 is disposed between the inner ring 114 and the outer ring 116. Furthermore, in some embodiments, the cage 118 includes a plurality of roller bearings 122 disposed between and in contact with the inner ring 114 and the outer ring 116. In some embodiments, the cage 118 includes a plurality of slots to secure the roller bearings 122. The plurality of roller bearings 122 may be disposed in the plurality of slots, such that, in some embodiments, each slot comprises at least one roller bearing 122. As such, the cage 118 and the plurality of roller bearings 122 may each be independent pieces.

Each roller bearing 122 may comprise a metal material. Furthermore, each roller bearing 122 may be coated with a non-metal material, for example, a rubber material or a phenolic material.

As the inner barrel 106 is rotated in a first direction, for example a clockwise direction, the inner ring 114 is also rotated in the first direction by the inner barrel 106. As such, the inner barrel 106 and the inner ring 114 are rotated at the same first rotational speed. Rotation of the inner ring 114 in the first direction at the first rotational speed causes each individual roller bearing 122 of the bearing assembly 108 to rotate about its own axis in a second direction, for example, a counter clockwise direction and roll along the inner surface of the outer ring 116. The roller bearings 122, as a group, rotate at a second rotational speed. The second rotational speed of the plurality of roller bearings 122 is less than the first rotational speed. In some embodiments, the second rotational speed of the plurality of individual rollers is nearly half of the first rotational speed of the inner barrel 106 and the inner ring 114. Although each individual roller bearing 122 rotates in the second direction, the plurality of roller bearings 122 revolve about the inner barrel 106 in the same first direction but at nearly half of the first rotational speed, or portion thereof.

The cage 118 of the bearing assembly 108 rotates with the plurality of roller bearings 122 at the second rotational speed, which is less than the first rotational speed. In some embodiments, the second rotational speed is nearly half of the first rotational speed. The cage insert 120 is also disposed between the inner ring 114 and the outer ring 116 and coupled to the cage 118. In some embodiments, the cage insert 120 is coupled to the cage 118 by a pin mechanism 124 so that the cage insert 120 is rotated at the second rotational speed via the bearing assembly 108.

In some embodiments, the RCD 100 further includes a second sleeve member 130. The second sleeve member 130 is disposed between the first seal 110 and the inner barrel 106. The second sleeve member 130 may be coupled to the inner barrel 106. The second sleeve member 130 may be configured to minimize wear of the first seal 110 as the inner barrel 106 and the first seal 110 rotate relative to each other. Alternatively, the first seal 110 may be in direct contact with the inner barrel 106.

The RCD 100 further includes a first seal assembly 101a and a second seal assembly 101b. The first seal assembly 101a may comprise the first seal 110 and a first seal carrier 128 that supports the first seal 110. The second seal assembly 101b may comprise the second seal 112 and a second seal carrier 126 that supports the second seal 112. One or more thrust and/or radial bearings 109 may be positioned between the first seal carrier 128 and the outer barrel 102. Furthermore, in some embodiments the radial bearings 109 may be enclosed in a race. In some embodiments, the radial bearings 109 may be supported within the race and/or within a support ring such as an inner ring and an outer ring and/or a head screw. In some embodiments, the head screw may be an extra wide head screw. Extra wide head screws may further be used to preload the radial bearings 109.

In some embodiments, the first seal assembly 101a may be a rotary seal assembly in that the first seal 110 and the first seal carrier 128 rotate relative to the inner barrel 106 and the outer barrel 102. The first seal 110 and the first seal carrier 128 are disposed between the outer barrel 102 and the inner barrel 106 and coupled to the roller bearing assembly 108. In particular, the first seal carrier 128 is coupled to the cage insert 120 of the bearing assembly 108 by a pin mechanism 140 as shown in FIG. 6. As such, the first seal 110 is rotatable at the second rotational speed relative to the inner barrel 106 via the bearing assembly 108.

The second rotational speed of the first seal 110 is less than, for example near half of, the first rotational speed of the inner barrel 106. By rotating the first seal 110 at the second rotational speed, which is less than the first rotational speed of the inner barrel 106, the speed differential between the first seal 110 and the inner barrel 106 is reduced, such as by near half. In some embodiments, the speed differential between the first seal 110 and the inner barrel 106 is reduced, and the reduction in speed may be dependent upon the bearing assembly 108. For example, in some embodiments, the speed may be reduced by 60% or 70%, while in other embodiments the speed may be reduced by 40% or 30%, although other reductions are contemplated. The reduction in speed between the first seal 110 and the inner barrel 106 reduces wear on the first seal 110, which results in longer seal life.

In some embodiments, the second seal assembly 101b may be a stationary seal assembly in that the second seal 112 and the second seal carrier 126 remain stationary relative to the inner barrel 106 and the outer barrel 102. The second seal 112 is coupled to the second seal carrier 126 and seals against the first seal carrier 128. In some embodiments, a support unit 154 may be disposed between the second seal carrier 126 and the outer barrel 102 to support the seal assemblies 101a, 101b and seal off the upper end of the outer barrel 102.

Since the first seal carrier 128 rotates at near half (or a portion) of the speed of the inner barrel 106, the speed differential between the first seal carrier 128 and the stationary second seal assembly 101b is also near half (or a portion) of the speed of the rotation of the inner barrel 106. The reduced speed between the first seal carrier 128 and the second seal 112 also reduces wear on the second seal 112, which results in longer seal life. The RCD 100 as described above partitions the rotating speed of the inner barrel 106 relative to the first seal 110 and the second seal 112 via the roller bearing assembly 108, which lengthens the life of each of the first seal 110 and the second seal 112.

Figure 7:
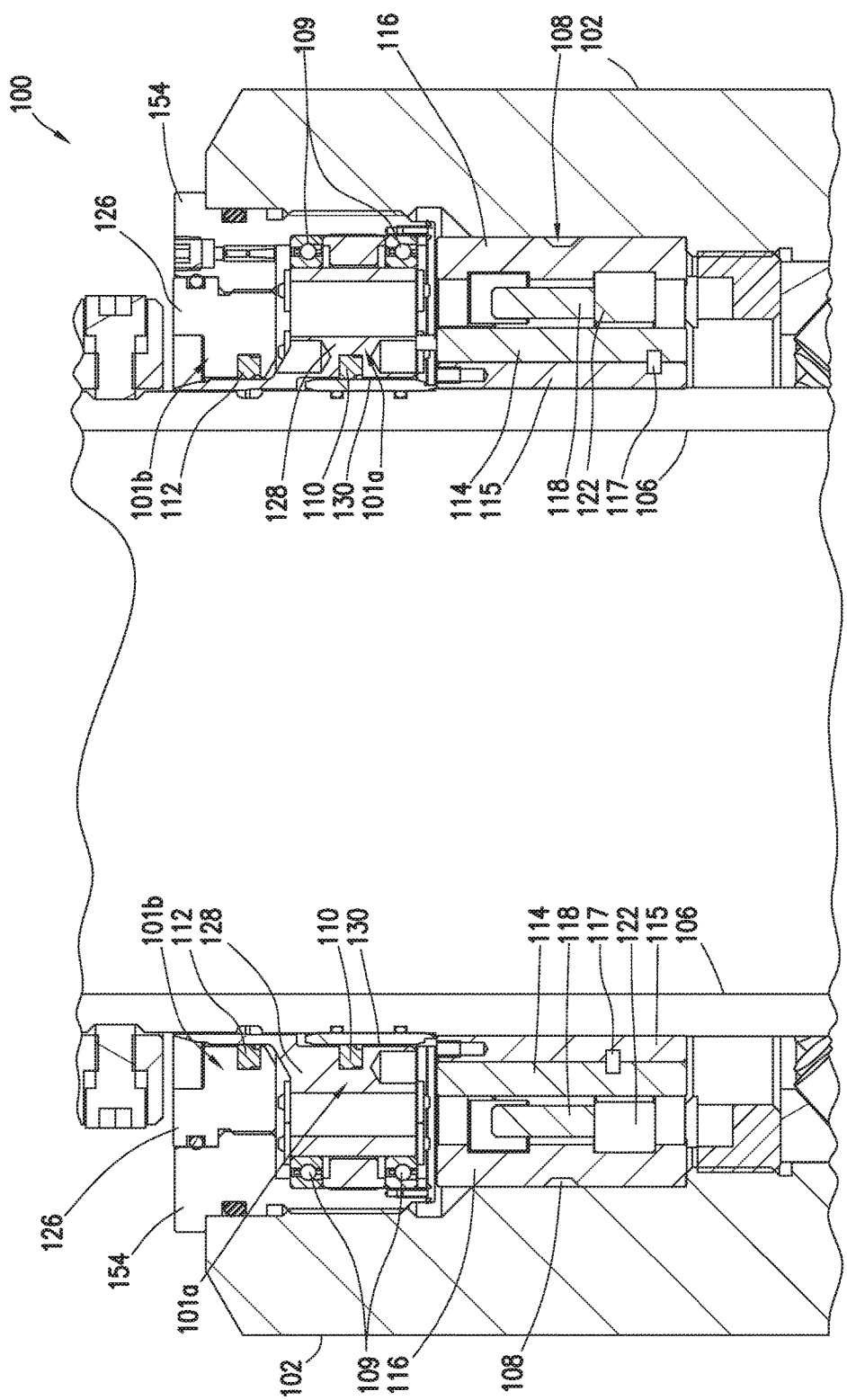
FIG. 7 illustrates an enlarged view of the region 5 of FIG. 3, according to an alternate embodiment disclosed herein.

FIG. 7 illustrates an alternate embodiment of the embodiment shown in FIG. 3. As shown in FIG. 7, the cage insert 120, the pin mechanism 124, and the pin mechanism 140 are omitted. In such an embodiment, the first seal assembly 101a may be driven by seal friction formed against the inner barrel 106. Specifically, the friction between the first seal assembly 101a and the inner barrel 106 causes the first seal assembly 101a to rotate rather than driving the first seal assembly 101a by the bearing assembly 108 as described above.

The rotation of the inner barrel 106 may cause the first seal assembly 101a to rotate through frictional contact between the inner barrel 106 and the first seal assembly 101a. However, frictional contact between the first seal assembly 101a and the second seal assembly 101b may prevent the first seal assembly 101a from rotating at the same speed as the inner barrel 106. Therefore, the relative speeds of the inner barrel 106 and the first seal assembly 101a may be split in some proportion, thereby reducing speed without any coupling to the bearing assembly 108. As such, the first seal assembly 101a is driven by seal friction with rotation of the inner barrel 106 at a reduced speed.

Benefits of the present disclosure include that the lifetime and performance of the first seal 110 and the second seal 112 is enhanced (e.g., nearly doubled) as the speed differential between the first seal 110 and the inner barrel 106 (as well as between the first seal carrier 128 and the second seal 112) is reduced. In some embodiments, the speed differential between the first seal 110 and the inner barrel 106 (as well as between the first seal carrier 128 and the second seal 112) is reduced by nearly half. The use of proven seals with known pressure and velocity limits permits the first seal 110 and the second seal 112 to nearly double performance life as the velocity factor is reduced by approximately fifty percent. Furthermore, no external pressure containment devices and/or external or internal lubrication systems are required to lengthen the lifespan of the seals as in prior RCD systems.

While the foregoing is directed to certain embodiments, other and further embodiments may be devised without departing from the basic scope thereof, and the scope thereof is determined by the claims that follow.

I claim:
1. A rotating control device, comprising:
an inner barrel having an inner barrel bore;
an outer barrel;
a sub having a sub bore and a sub seal, and wherein the sub is coupled to the inner barrel;
a roller bearing assembly disposed between the inner barrel and the outer barrel, wherein the roller bearing assembly is rotatable by rotation of the inner barrel;
a rotary seal assembly coupled to the roller bearing assembly; and
a stationary seal assembly disposed adjacent to the rotary seal assembly.

2. The rotating control device of claim 1, wherein the rotary seal assembly is rotatable relative to the inner barrel and the outer barrel.

3. The rotating control device of claim 1, wherein the roller bearing assembly comprises:
an inner ring;
an outer ring;
a plurality of roller bearings disposed between the inner ring and the outer ring;
a cage comprising a plurality of roller bearing slots, wherein at least one roller bearing is disposed in each roller bearing slot; and
a cage insert coupled to the cage.

4. The rotating control device of claim 3, wherein the cage insert is coupled to the cage by a pin mechanism.

5. The rotating control device of claim 4, wherein the rotary seal assembly is coupled to the cage insert by another pin mechanism.

6. The rotating control device of claim 5, wherein the inner barrel is rotatable at a first rotational speed, and wherein the cage of the roller bearing assembly is rotatable by rotation of the inner barrel at a second rotational speed less than the first rotational speed.

7. The rotating control device of claim 1, wherein the stationary seal assembly includes a seal configured to seal against the rotary seal assembly.

8. A rotating control device, comprising:
an inner barrel;
an outer barrel;
a roller bearing assembly comprising an inner ring, an outer ring, a cage comprising a plurality of slots, a plurality of roller bearings secured by the slots, and a cage insert disposed between the inner and outer rings, wherein the roller bearing assembly is coupled to the inner barrel;
a first seal coupled to a first seal carrier, wherein the first seal carrier is coupled to the cage insert of the roller bearing assembly; and
a second seal coupled to a second seal carrier, wherein the second seal is disposed adjacent to the first seal and seals against the first seal carrier.

9. The rotating control device of claim 8, wherein the roller bearing assembly is rotatable by rotation of the inner barrel to rotate the first seal carrier.

10. The rotating control device of claim 8, wherein the second seal is stationary relative to the outer barrel.

11. The rotating control device of claim 8, wherein the first seal is rotatable relative to the inner barrel and the outer barrel.

12. The rotating control device of claim 11, wherein the first seal is rotatable by rotation of the inner barrel via the roller bearing assembly at a first rotational speed.

13. The rotating control device of claim 12, wherein the first rotational speed of the first seal is lower than a second rotational speed of the inner barrel.

14. The rotating control device of claim 8, wherein the cage insert is coupled to the cage by a pin mechanism.

15. The rotating control device of claim 14, wherein the first seal carrier is coupled to the cage insert by another pin mechanism.

16. The rotating control device of claim 8, further comprising a sleeve member disposed between the first seal and the inner barrel.

17. The rotating control device of claim 16, wherein the sleeve member is a second sleeve member, and wherein a first sleeve member is coupled to the inner ring by a link member.

18. The rotating control device of claim 8, wherein at least one roller bearing is disposed in each slot, and wherein the cage is disposed between the inner ring and the outer ring.

19. A rotating control device, comprising:
an inner barrel;
an outer barrel;
a roller bearing assembly disposed between the inner barrel and the outer barrel, the roller bearing assembly having a plurality of roller bearings;
a rotary seal assembly coupled to the roller bearing assembly and disposed between the inner barrel and the outer barrel, wherein the rotary seal assembly is rotatable by frictional contact with the inner barrel, and wherein the rotary seal assembly comprises a first seal coupled to a first seal carrier, and wherein the first seal is in contact with the inner barrel;
a stationary seal assembly disposed between the inner barrel and the outer barrel, wherein the stationary seal assembly comprises a second seal coupled to a second seal carrier, and wherein the second seal is in contact with the first seal carrier;
at least one bearing between the first seal carrier and the outer barrel, wherein the at least one bearing is at least one of a radial bearing or a thrust bearing; and
wherein the stationary seal assembly is in frictional contact with the rotary seal assembly to prevent the rotary seal assembly from rotating at the same speed as the inner barrel.

20. The rotating control device of claim 19, wherein the rotary seal assembly rotates at a first rotational speed, wherein the inner barrel rotates at a second rotational speed, and wherein the first rotational speed is less than the second rotational speed.

21. The rotating control device of claim 19, wherein the roller bearing assembly includes an inner ring, an outer ring, a cage having a plurality of slots, and at least one roller bearing of the plurality of roller bearings disposed in each slot, wherein the cage is disposed between the inner ring and the outer ring.

22. The rotating control device of claim 19, wherein the inner barrel is rotatable relative to the rotary seal assembly and the stationary seal assembly.

23. The rotating control device of claim 22, wherein the rotary seal assembly is rotatable relative to the stationary seal assembly.

24. The rotating control device of claim 19, further comprising a support unit disposed between the second seal carrier and the outer barrel.

25. The rotating control device of claim 24, wherein the support unit is in sealing engagement with the outer barrel.

* * * * *